Nov. 2, 1965    W. C. VAN'T SANT    3,215,414
CONTACTING TRAY WITH VARIABLE PASSAGE
Filed July 19, 1962    2 Sheets-Sheet 1

INVENTOR:
WILLEM C. VAN'T SANT
BY: *Oswald H. Wilmore*
HIS ATTORNEY

INVENTOR:
WILLEM C. VAN'T SANT
BY:
HIS ATTORNEY 3,215,414
CONTACTING TRAY WITH VARIABLE PASSAGE
Willem C. Van't Sant, The Hague, Netherlands, assignor to Shell Oil Company, New York, N.Y., a corporation of Delaware
Filed July 19, 1962, Ser. No. 211,026
Claims priority, application Netherlands, July 28, 1961, 267,678
11 Claims. (Cl. 261—114)

The invention relates to contacting trays, sometimes called bubble trays, suitable for installation in a contacting column for effecting exchange between ascending gas and descending liquid, e.g., for distillation, absorption, or the like. The term "gas" is used herein to include vapor.

More particularly, the invention is concerned with contacting trays having variable gas passages, wherein the gas passages are controlled by valve bodies which are positioned over the passages through the trays and are supported in their lowest (closed) positions by the upper tray surface, wherein each valve body has guides projecting downward through the passage and distributed about the periphery of the passage, the lower ends of said guides being provided with abutments for impinging on the bottom of the tray when the valve is lifted. Trays of this type are known, for instance, from the British patent specification 843,280 of August 4, 1960.

The elements which form the guides may, in known constructions, consist of metal strips welded to the valve body. These elements may also be integral with the valve body, as in the constructions described in the said British patent specification. In this instance the valve body is stamped out of a metal plate together with the said elements, which are then bent downwards. The said elements may be stamped out of the inner part of the valve body, thereby forming openings in the valve body, so that the body cannot fully close the passage. There are, however, also constructions in which the said elements, before being bent downwards, extend radially outwards from the valve body so that no opening is formed therein.

In the last-mentioned case the consumption of structural material to form the body is greater than in the former case and is uneconomic. If use is made of guides stamped out of the valve body, as shown in the said British patent specification, an additional cover plate should be provided if it is desired to obtain a fully closed valve body or if the openings are larger than desired. However, it is usually desired to maintain openings in the valve body, insuring a minimum free passage through the tray at all times. Further, it was found to be undesirable that the valve body come into contact with the tray over the whole periphery due to the danger of sticking, which can lead to failure to open and consequent operational failure. An opening obtained by stamping the guides out of the valve body is not always attractive as the size of such an opening is always determined by the dimensions of the guide members and by the number thereof.

Moreover owing to the small size of the valve body, the length of the guides cannot be freely selected. Elements welded to the valve body do not lead to these limitations although, on the other hand, an additional operation, namely welding, is required in fabrication.

It is, further, desirable that the guides be resilient to permit their inward flexure for permitting the stops at their ends to pass through the tray opening; however, the valve body itself should be stiff enough to maintain its shape. This had led to a two-part construction, in which the guides are made of different material from the body. It is desirable in such constructions that the parts be capable of easy assembly and that the resilient guides be durable, e.g., not subject to deterioration upon repeated flexure and exposure to the fluids in the column.

The object of the invention is to provide a tray construction having an improved valve for controlling the passage through the tray, the advantages of the valve being explained hereinafter.

According to the invention the bubble tray has one or more flow passages, each having an individual, vertically movable valve, and each valve includes a valve body which remains above the tray and has attached thereto a plurality of vertical guides made of resilient metal bands and extending downwards from the body, the lower parts of said guides being formed to provide outwardly-extending and upwardly-directed retaining abutments which engage the under side of the tray to act as stops for limiting the upward movement of the valve. Two or more of such vertical guides are formed integrally to form a unit with an upper, horizontal part which is juxtaposed to the valve body.

In the preferred arrangement one or more guide unit(s) is (are) secured to the valve body by resilient clamping. According to one embodiment this clamping is effected by providing on each vertical guide an inwardly and downwardly extending tab to expose an upwardly directed edge on the guide, said tabs and edges being engaged by retaining elements of the valve body. According to another embodiment dimples are formed on the guides for equivalent action.

Moreover, the valve body is advantageously provided with positioning means for the guides, such as openings formed in the body and with retaining means, such as bent-down lips at the edges of the openings, which engage the outer sides of parts of the band-shaped vertical guides which extend vertically through the recesses. In the preferred construction this feature is combined with that of the preceding paragraph, so that the lips on the valve body engage the said tabs on the guides and the said exposed edges or enter the said dimples. The said openings may be recesses formed in the periphery of the valve body or holes situated inwardly from the margin of the body.

The lips on the valve body mentioned in the preceding paragraph are preferably shaped to engage the upper tray surface and maintain the principal parts of the body above the tray, whereby the valve is prevented from closing the tray opening entirely and the danger of sticking is minimized. The lips, therefore, perform a dual function of locking the guide units and supporting the valve body, leading to economy in construction and utilization of materials.

Also, the outer faces of the guides, at the said abutments retaining, are preferably inclined convergently downwards, whereby the guides are forced resiliently together upon engagement with the edges of the tray opening during installation. This makes it unnecessary to grasp the guides to permit the abutments or stops to pass through the opening. By the use of flat, resilient bands this flexure of the guides is readily effected, without danger of distorting the guides to the extent that malfunctioning would occur in service.

Certain important advantages of this valve construction are as follows:

The multi-part valve can be easily assembled by clamping the guide unit to the valve body, leading to reduced assembly costs.

By using a flat band instead of a wire for the resilient guides the latter have greater durability and resistance to corrosion than is the case when circular wire is used. It may be noted that the resilient guides are subjected to flexure and the action of the fluids in the column, and that this sometimes leads to stress-corrosion.

Also, the use of such bands permits a simple and improved arrangement for securing the guide unit to the valve body. Should any guide be damaged, a new guide unit can be readily substituted.

This construction makes it possible to leave the valve body intact, i.e., without openings, or to provide one or more openings as desired with full freedom of choice as to the shape, location and size thereof. Moreover, the vertical dimensions of the retaining lips in the valve body can be made varied, thereby facilitating control of the minimal opening in the passage. Also, the construction achieves economical utilization of metal, without waste of the material used for the body.

The resilient guides make the valve considerably less expensive to install on the tray than valves used heretofore. The valve can, if desired, be installed from the upper side only, thereby obviating the need for a workman beneath the tray; in contrast, with the known valves at least one of the guides had to be bent outward to form a stop after the valve was emplaced. This is unnecessary with the valve of the invention which, due to the resilient construction of the guides, clicks into position.

The stops on the guides are preferably constituted by tongues which project outwardly and upwardly at an acute angle to the vertical by making an incision into the band-shaped guide. According to an alternative construction, similar outwardly and upwardly projecting abutments are formed by bending the lower ends of the guides outward and divergently upwards. In both cases the inclined tongue or ends of the guides cause the guides to flex toward each other as the assembled unit is pushed downwards through the tray opening, whereby the valve, so to speak "seeks" the center of the opening and it is not necessary to grasp the guides to compress them radially. As soon as the stops have passed through the opening the guides click back, close to or in touching relation to the edge of the opening and the stops act in the manner of barbs.

The invention will not be further illustrated with reference to the accompanying drawing forming a part of this specification and showing six preferred embodiments, wherein.

Figure 1:
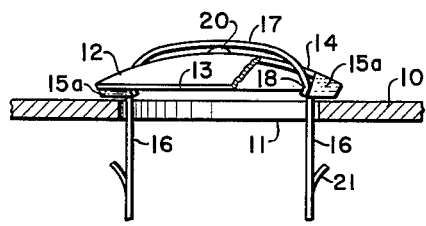
FIGURE 1 is a vertical sectional view through a part of a tray showing a valve, partly in section and partly in elevation.
Figure 2:
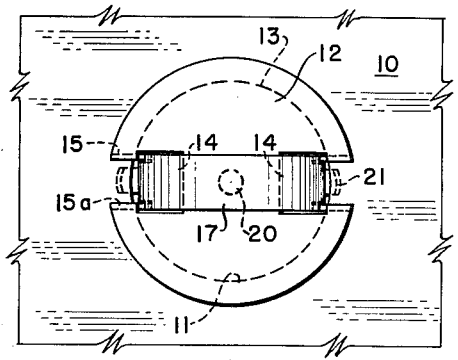
FIGURE 2 is a plan view of the valve according to FIGURE 1 and a portion of a tray.
Figure 3:
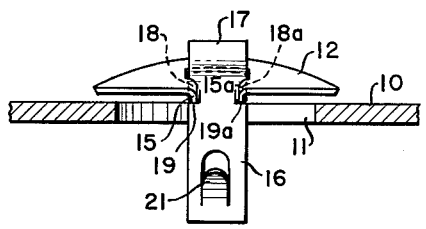
FIGURE 3 is a sectional view corresponding to FIGURE 1 with the valve rotated 90°.
Figure 11:
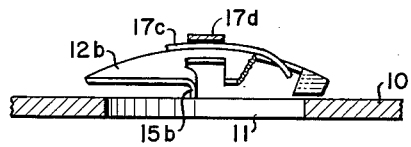
Figure 13:
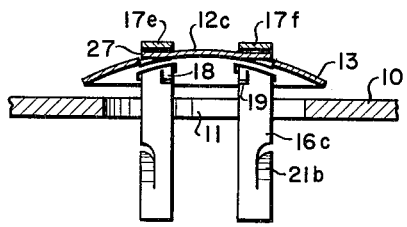
Figure 12:
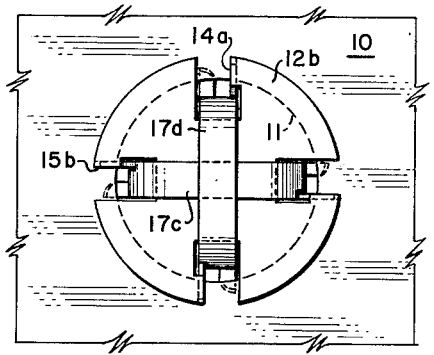
Figure 14:
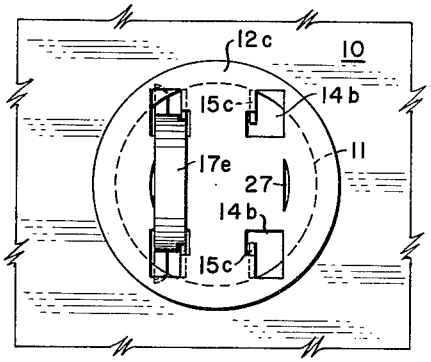

FIGURES 11 and 12 are, respectively, a sectional elevation and a plan view corresponding to FIGURES 1 and 2, of a fifth embodiment; and FIGURES 13 and 14 are, respectively, a plan and a sectional view of a sixth embodiment.

Referring to FIGURES 1–4, 10 represents a part of a contacting tray having a plurality of gas openings 11, only one of which appears. It will be understood that several of such trays are mounted in vertically spaced relation within a contacting column to accumulate bodies of liquid which descend in known manner from tray to tray, e.g., via downcomers or through the said gas openings. Each said opening has a vertically movable valve which includes a valve body 12, e.g., made of imperforate sheet metal, which preferably has its edge 13 inclined downwardly to provide a rim. Two openings, in the form of recesses or notches 14, are formed in the rim 13 at diametrically opposite locations by making parallel, substantially radial cuts. The metal is bent downward at both sides of each notch to provide retaining and support tabs or lips 15 and 15a, which extend below the rim. These downwardly projecting lips are situated outwardly from the edge of the opening 11 to engage the top surface of the tray as shown in FIGURE 1, leaving the bottom of the rim spaced slightly from said surface.

Figure 8:
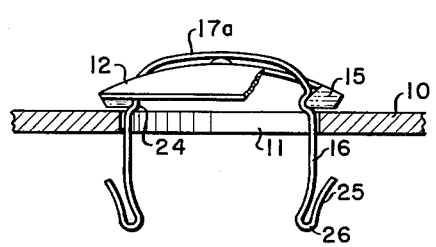
FIGURE 8 is a sectional elevation corresponding to FIGURE 1 showing a third embodiment.

Each valve body carries a plurality of vertical guides formed, in this embodiment, by the terminal portions 16 of a one-piece dual guide unit which includes further a substantially horizontal part 17 situated above the body, in engagement therewith. The guide unit is formed of a flat, resilient metal strip or band, such as spring steel, and the guides 16 extend downwards through the recesses in the valve body. The parts of the guides in these recesses have incisions and the portions of the guides just above these incisions are bent inwardly to form pairs of downwardly and inwardly inclined marginal tabs 18, 18a, the outer faces of which are resiliently in engagement with the radially inner edges of the lips 15, 15a, respectively. The lower edges of the lips 15, 15a, are in engagement with the upwardly directed edges 19, 19a, on the guides which are exposed by bending in the tabs 18, 18a. These edges form positioning abutments. The valve body may be formed with a central upward protuberance 20 to engage the part 17 of the guide unit, which is thereby resiliently clamped in place. Thus, the protuberance 20 exerts an upward force on the guide unit in opposition to the downward force of the lips 15, 15a, while these lips further bear against the tabs 18, 18a, to prevent radial outward displacement of the guides. The diametrically opposed recesses in the body provide positioning means to prevent circumferential displacement of the guides. (Instead of tabs 18, 18a, simple horizontal protuberances may be used, will be as illustrated in FIGURE 8.)

The said guides 16 extend downwardly from the valve body spaced inwardly from but in close proximity to the edge of the opening 11 when relaxed; however, this spacing is not restrictive of the invention. The lower parts of the guides carry outwardly-extending and upwardly-directed retaining abutments 21 to form stops which engage the under side of the tray 10 when the valve is lifted to its uppermost position. These abutments may be formed integrally with the guides as tongues which are bent outwards after forming incisions in the band material; the tongues 21 preferably make an acute angle to the vertical.

The guide unit is assembled to the valve body by inserting the ends of the guides into the recesses of the valve body, behind the lips 15, 15a, the tongues 21 passing downwards between the said lips and the guides being flexed to snap them into position with respect to the lips 15, 15a. The valve can, however, also be assembled as described hereinafter for FIGURES 5–7.

The assembled valves can be emplaced in the tray in a simple manner by forcing it downwards through the opening 11 from the top of the tray. The guides are deflected radially inwardly by a camming action when the tongues 21 engage the tray until they are fully below the tray, whereupon they move resiliently back to or substantially to the positions shown.

Figure 5:
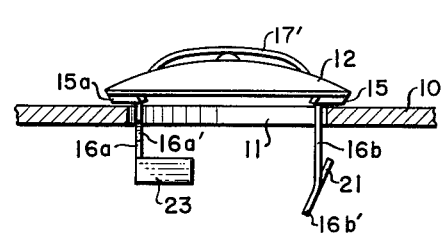
FIGURES 5, 6 and 7 are, respectively, a sectional elevation plan and a sectional elevation view corresponding to FIGURES 1, 2 and 3 and showing a modified construction of the valve body.
Figure 6:
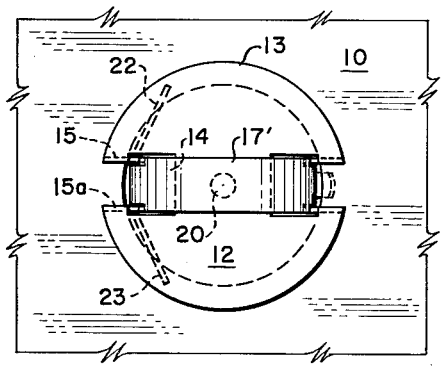
Figure 7:
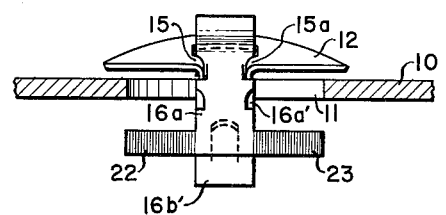
Figure 4:
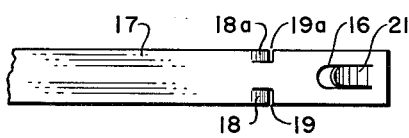
FIGURE 4 is a fragmentary plan view of a guide unit prior to bending.

The embodiment according to FIGURES 5–7 differs from the above-mentioned embodiment to the extent that the stops at the bottoms of the guides are formed in another manner. Otherwise the two constructions are alike and like reference numbers denote like parts. In this construction the lower end of the guide 16a at one end of the spring part 17' is provided with a foot in the form of an inverted capital T (see FIGURE 7). The laterally extending parts 22, 23 which form this foot are bent in such a way (see FIGURE 6) as to engage widely spaced points of the tray, thereby to obtain a better support when the valve is open, so that the risk of the valve's tipping over is entirely obviated. The guide 16a has notches 16a' at its margins to permit it to be passed between the lips 15, 15a during assembly. The other guide 16b is constructed as was described for the first embodiment, except that the lowermost part 16b' is inclined inwardly to extend the camming surface. When the valve is in its uppermost position it is supported by the tray at three points, namely, the parts 21, 22 and 23.

In this embodiment, in lieu of the notches 16a', at least one of the lips 15, 15a, which adjoin the guide 16a can be initially bent downwards to permit radial insertion of the guide, and thereafter bent into retaining position after assembly.

The valve is installed by first passing the guide 16a through the center of the tray opening, after which the other guide 16b is pressed through the opening; by means of the spring tension, the valve clicks into position after the tongue 21 passes through the opening.

FIGURE 8 shows a variation in which dimples 24, formed in the band spring just beyond the ends of the horizontal part 17a, receive the inner and lower corners of the lips 15, 15a to prevent outward and upward movement of the guide unit, these dimples serving as positioning abutments and being used in lieu of the tabs 18, 18a and the edges 19, 19a. Further, the retaining abutments 25 at the bottoms of the guides 16 are formed by bending the terminal parts outwards and upwards while forming loops 26, the upper parts of the abutments preferably making an acute angle with the vertical. By making the bent portions 25 narrower than the guides 16 they can pass between the lips 15 and 15a during assembly; or the guide can be assembled as was described for FIGURES 5–7 (using notches or bending the lips). The construction is otherwise as was described for FIGURES 1–4.

Figure 9:
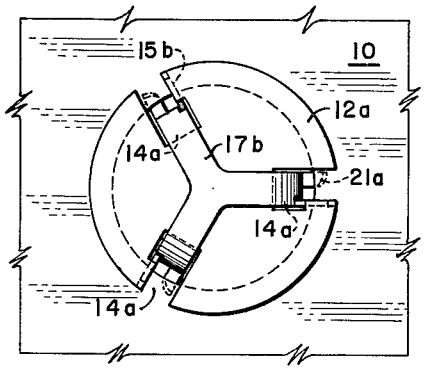
FIGURES 9 and 10 are, respectively, a plan and a sectional elevation view, corresponding to FIGURES 2 and 3, of a fourth embodiment.
Figure 10:
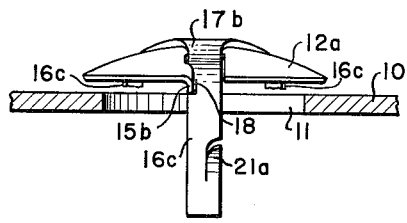

FIGURES 9 and 10 show a valve in which the triple guide unit includes a central part 17b and three resilient guides 16c. These are positioned in three separate identically shaped recesses 14a in the valve body 12a. Each recess has only one lip 15b, coacting with a single tab 18 on the guide as was described for the first retaining embodiment. The abutments 21a in this construction are tongues situated at the edge of each guide remote from the tabs 18 to pass between the lips 15b and the opposite edges of the recesses 14a during assembly. Although only one lip 15b is used at each recess in this embodiment, and the abutments 21a are narrower and eccentric, this is no drawback because the guide unit carries three guides, which are clamped to the valve body at three distributed points and the valve is supported in its open position by the under side of the tray at three points.

In the fifth embodiment (FIGURES 11 and 12) the valve body 12b is provided with four recesses 14a and carries two dual guide units and has a total of four guides. Thus one guide has an upper, substantially horizontal part 17c and the other similar upper part 17d, disposed at right angles to the former. Each guide unit has two vertical guides, constructed as was described for the fourth embodiment (FIGURES 9 and 10).

In the sixth embodiment (FIGURES 13 and 14), there are also two dual guide units, providing a total of four guides. This differs from the previous embodiment in that the upper parts 17e, 17f, of the guide units are parallel and do not cross; the guide unit 17f was omitted from FIGURE 14 for clarity. Moreover, in this embodiment the valve body 12c has four openings 14b which are situated inwards from the edge of the body, instead of being marginal notches. As appears in FIGURE 14, each opening has on one side a lip 15c which is bent down to extend below the rim 13 of the valve body for supporting it from the tray and to retain the guide unit by pressure against the tabs 18 and against the edges 19. Further, the upwardly convex top of the valve body is partly flattened, producing an edge 27.

The valve body of the sixth embodiment is assembled by pushing the guide units through the holes 14b to snap them into clamping engagement.

Although several specific embodiments were described in detail, it is evident that the invention is not restricted thereto. For example, it is not necessary to juxtapose the horizontal parts of the guide units above the valve body.

The valves according to the invention have the additional attraction that the valves and trays can be easily transported from the factory to the column site without prior fitting of the valves, which can be assembled easily after the trays are installed. This obviates danger of damage to the valves during shipment.

I claim as my invention:

1. A gas-liquid contacting apparatus comprising: a contacting tray adapted to be mounted horizontally within a contacting column to retain a body of liquid thereon and having a flow opening therethrough, and a valve mounted on said tray for vertical movement to control the passage through the said opening, the said valve comprising:
   (a) a valve body situated above the tray at said opening having support means engaging the upper tray surface when the valve is in its lowermost position, and
   (b) a separate guide unit and means to attach said unit to the valve body, said unit including
      (1) an upper, substantially horizontal part juxtaposed to and above said valve body, and
      (2) a pair of vertical guides integral to said upper part and extending downwardly through the valve body near the edge of said opening,
      (3) said unit being formed of flat, resilient metal,
   (c) said guides having outwardly-extending and upwardly-directed retaining abutments at their lower parts positioned laterally outside of the said flow opening for engagement with the under side of the tray to limit upward movement of the valve,
   (d) said abutments being movable inwardly by flexure of the guides to permit downward passage through the opening, and
   (e) said valve body having circumferentially distributed means for position said guides against circumferential displacement.

2. Apparatus as defined in claim 1 wherein said retaining abutments are integral with the guides and are constituted by outwardly and upwardly bent terminal portions of the said guides, said portions extending outwardly at acute angles to the guides whereby the free ends thereof are engageable with the under side of the tray.

3. Apparatus as defined in claim 1 wherein
   the said guides are formed with integral, upwardly directed positioning abutments which are situated at opposed sides of the center of the valve body and are in engagement with downwardly directed parts of the valve body for securing the guide unit to the body.

4. Apparatus as defined in claim 3 wherein said upwardly directed positioning abutments are dimples formed in the guides.

5. Apparatus as defined in claim 3 wherein said upwardly directed abutments are edges of the guides which are formed by incisions in the guides.

6. Apparatus as defined in claim 5 wherein the parts of the guides at said incisions are bent inwards to form tabs and said valve body has retaining means in engagement with the outer sides of said tabs.

7. A gas-liquid contacting apparatus comprising: a contacting tray adapted to be mounted horizontally within a contacting column to retain a body of liquid thereon and having a flow opening therethrough, and a valve mounted on said tray for vertical movement to control the passage through the said opening, the said valve comprising:
   (a) a valve body situated above the tray at said opening having support means engaging the upper tray surface when the valve is in its lowermost position,
(b) said body having a plurality of openings extending radially inwards from the body periphery and providing radially inwardly directed retaining means at said openings,
(c) a separate guide unit which is attached to the said body and includes
    (1) an upper, substantially horizontal part juxtaposed to and situated above said valve body, and
    (2) a pair of vertical guides integral to said upper part and extending downwardly from said valve body through said openings behind said retaining means,
    (3) said unit being formed of flat, resilient metal,
(d) said guides having outwardly-extending and upwardly-directed abutments at their lower parts positioned laterally outside of the said flow opening for engagement with the under side of the tray to limit upward movement of the valve, and
(e) said abutments being movable inwardly by flexure of the guides to permit downward passage through the opening.

8. Apparatus as defined in claim 7 wherein said openings are recesses extending substantially radially inwards from the outer margin of the valve body.

9. Apparatus as defined in claim 7 wherein said openings are holes situated inwardly from the outer margin of the valve body.

10. Apparatus as defined in claim 7 wherein said retaining means are lips which are situated on at least one edge of each opening and are bent down, said lips being engageable with the upper surface of the tray when the valve is in its lowermost position to maintain the other parts of the valve body spaced from the tray, and constitute the said means for supporting the valve body.

11. In combination with the apparatus as defined in claim 10, downwardly and inwardly inclined tabs formed on said guide members having their outer faces in engagement with the inner side of the said lips on the valve body, the lower portions of the lips being in engagement with upwardly directed edges on the guides adjoining the tabs.

References Cited by the Examiner
UNITED STATES PATENTS

| | | |
|---|---|---|
| 2,720,289 | 10/55 | Henrickson. |
| 2,964,814 | 12/60 | Parkin. |
| 3,019,003 | 1/62 | Glitsch _____ 261—114 |
| 3,080,155 | 3/63 | Glitsch et al. _____ 261—114 |

FOREIGN PATENTS

| | | |
|---|---|---|
| 843,280 | 8/60 | Great Britain. |

HARRY B. THORNTON, *Primary Examiner.*

HERBERT L. MARTIN, *Examiner.*